US008872964B2

(12) United States Patent
Reed et al.

(10) Patent No.: US 8,872,964 B2
(45) Date of Patent: Oct. 28, 2014

(54) LONG-RANGE MOTION DETECTION FOR ILLUMINATION CONTROL

(75) Inventors: William G. Reed, Seattle, WA (US); Dale H. DeGraff, Brier, WA (US)

(73) Assignee: Express Imaging Systems, LLC, Seattle, WA (US)

(*) Notice: Subject to any disclaimer, the term of this patent is extended or adjusted under 35 U.S.C. 154(b) by 588 days.

(21) Appl. No.: 12/784,080

(22) Filed: May 20, 2010

(65) Prior Publication Data

US 2010/0295946 A1  Nov. 25, 2010

Related U.S. Application Data

(60) Provisional application No. 61/180,017, filed on May 20, 2009.

(51) Int. Cl.
*H04N 5/222* (2006.01)
*H05B 37/02* (2006.01)

(52) U.S. Cl.
CPC ............. *H05B 37/0227* (2013.01); *Y02B 20/44* (2013.01)
USPC ............................ 348/370; 348/154; 315/158

(58) Field of Classification Search
CPC ............. G06K 9/2027; G06K 9/00825; B60Q 2300/314; H04N 5/335; H04N 5/2354; H04N 5/2256; G01J 1/4204
USPC .......... 315/129–136, 149–159; 348/153, 154, 348/155, 208.1, 208.2, 294, 370; 340/541, 340/815.45; 725/105; 250/205; 307/117; 382/107
See application file for complete search history.

(56) References Cited

U.S. PATENT DOCUMENTS

| 4,153,927 | A | 5/1979 | Owens |
| 4,237,377 | A | 12/1980 | Sansum |

(Continued)

FOREIGN PATENT DOCUMENTS

| DE | 40 01 980 | 8/1990 |
| EP | 1 734 795 | 12/2006 |

(Continued)

OTHER PUBLICATIONS

Reed, "Electronic Control to Regulate Power for Solid-State Lighting and Methods Thereof," U.S. Appl. No. 61/115,438, filed Nov. 17, 2008, 51 pages.

(Continued)

*Primary Examiner* — Sath V Perungavoor
*Assistant Examiner* — Nathnael Aynalem
(74) *Attorney, Agent, or Firm* — Seed IP Law Group PLLC

(57) ABSTRACT

An illumination system and methods to control a light source are provided. An illumination system includes a light source, a two-dimensional non-Passive Infrared (non-PIR) imager, and a controller. The light source provides at least two levels of illumination. The non-PIR imager images an area and to produce image data representative of images across at least part of a visible portion of an electromagnetic spectrum. The controller is communicatively coupled to receive the image data from the non-PIR imager and process the received image data to detect at least one ambient environmental characteristic of the area in the part of the visible portion of the electromagnetic spectrum, where the ambient environmental characteristic is indicative of a presence or imminent presence of a body in the area. The controller is also coupled to control operation of the light source based on, at least in part, detection of the ambient characteristic of the environment.

25 Claims, 4 Drawing Sheets

(56) References Cited

U.S. PATENT DOCUMENTS

| | | | |
|---|---|---|---|
| 5,086,379 A | 2/1992 | Denison et al. | |
| 5,160,202 A | 11/1992 | Légaré | 362/153.1 |
| 5,230,556 A | 7/1993 | Canty et al. | |
| 5,276,385 A | 1/1994 | Itoh et al. | |
| 5,343,121 A | 8/1994 | Terman et al. | 315/158 |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | 315/360 |
| 5,808,294 A | 9/1998 | Neumann | |
| 6,111,739 A | 8/2000 | Wu et al. | 361/106 |
| 6,612,720 B1 | 9/2003 | Beadle | |
| 6,674,060 B2 | 1/2004 | Antila | |
| 6,753,842 B1 | 6/2004 | Williams et al. | |
| 6,841,947 B2 | 1/2005 | Berg-johansen | |
| 6,902,292 B2 | 6/2005 | Lai | |
| 7,019,276 B2 | 3/2006 | Cloutier et al. | |
| 7,066,622 B2 | 6/2006 | Alessio | |
| 7,122,976 B1 | 10/2006 | Null et al. | 315/362 |
| 7,188,967 B2 | 3/2007 | Dalton et al. | |
| 7,239,087 B2 | 7/2007 | Ball | |
| 7,281,820 B2 | 10/2007 | Bayat et al. | |
| 7,317,403 B2 | 1/2008 | Grootes et al. | |
| 7,339,323 B2 | 3/2008 | Bucur | |
| 7,339,471 B1 * | 3/2008 | Chan et al. | 340/541 |
| 7,405,524 B2 * | 7/2008 | Null et al. | 315/308 |
| 7,440,280 B2 | 10/2008 | Shuy | |
| 7,468,723 B1 | 12/2008 | Collins | |
| 7,578,596 B2 | 8/2009 | Martin | |
| 7,627,372 B2 | 12/2009 | Vaisnys et al. | |
| 7,677,753 B1 | 3/2010 | Wills | |
| 7,688,002 B2 | 3/2010 | Ashdown et al. | |
| 7,688,222 B2 * | 3/2010 | Peddie et al. | 340/905 |
| 7,703,951 B2 | 4/2010 | Piepgras et al. | |
| 7,804,200 B2 * | 9/2010 | Flaherty | 307/117 |
| 7,834,922 B2 * | 11/2010 | Kurane | 348/294 |
| 7,940,191 B2 * | 5/2011 | Hierzer | 340/815.45 |
| 8,174,212 B2 | 5/2012 | Tziony et al. | |
| 2002/0113192 A1 * | 8/2002 | Antila | 250/205 |
| 2004/0095772 A1 | 5/2004 | Hoover et al. | 362/363 |
| 2004/0105264 A1 | 6/2004 | Spero | 362/274 |
| 2004/0120148 A1 | 6/2004 | Morris et al. | 362/264 |
| 2004/0124338 A1 * | 7/2004 | Cloutier et al. | 250/214 C |
| 2004/0192227 A1 | 9/2004 | Beach et al. | |
| 2005/0135101 A1 | 6/2005 | Richmond | 362/276 |
| 2005/0174780 A1 | 8/2005 | Park | 362/294 |
| 2005/0243022 A1 | 11/2005 | Negru | |
| 2005/0254013 A1 | 11/2005 | Engle et al. | 353/52 |
| 2006/0001384 A1 | 1/2006 | Tain et al. | 315/246 |
| 2006/0014118 A1 | 1/2006 | Utama | 433/31 |
| 2006/0053459 A1 * | 3/2006 | Simerly et al. | 725/105 |
| 2006/0066264 A1 | 3/2006 | Ishigaki et al. | |
| 2006/0158130 A1 | 7/2006 | Furukawa | |
| 2006/0202914 A1 | 9/2006 | Ashdown | 345/46 |
| 2006/0277823 A1 | 12/2006 | Barnett et al. | 47/33 |
| 2007/0032990 A1 | 2/2007 | Williams et al. | |
| 2007/0096118 A1 | 5/2007 | Mahalingam et al. | 257/81 |
| 2007/0102033 A1 | 5/2007 | Petrocy | 136/203 |
| 2007/0247853 A1 | 10/2007 | Dorogi | 362/294 |
| 2007/0279921 A1 | 12/2007 | Alexander et al. | 362/368 |
| 2008/0018261 A1 | 1/2008 | Kastner | |
| 2008/0043106 A1 * | 2/2008 | Hassapis et al. | 348/153 |
| 2008/0130304 A1 | 6/2008 | Rash et al. | |
| 2008/0266839 A1 | 10/2008 | Claypool et al. | |
| 2008/0271065 A1 | 10/2008 | Buonasera et al. | 725/10 |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0230883 A1 | 9/2009 | Haug | |
| 2009/0235208 A1 | 9/2009 | Nakayama et al. | |
| 2009/0261735 A1 | 10/2009 | Sibalich et al. | |
| 2009/0268023 A1 * | 10/2009 | Hsieh | 348/143 |
| 2009/0278474 A1 | 11/2009 | Reed et al. | 315/294 |
| 2009/0278479 A1 | 11/2009 | Platner et al. | |
| 2009/0284155 A1 | 11/2009 | Reed et al. | 315/32 |
| 2010/0052557 A1 | 3/2010 | Van Der Veen et al. | |
| 2010/0060130 A1 | 3/2010 | Li | 313/46 |
| 2010/0090577 A1 | 4/2010 | Reed et al. | 313/46 |
| 2010/0096460 A1 * | 4/2010 | Carlson et al. | 235/462.07 |
| 2010/0123403 A1 | 5/2010 | Reed | 315/193 |
| 2010/0171442 A1 | 7/2010 | Draper et al. | |
| 2010/0259193 A1 | 10/2010 | Umezawa et al. | |
| 2010/0271802 A1 | 10/2010 | Recker et al. | |
| 2010/0277082 A1 | 11/2010 | Reed et al. | 315/159 |
| 2010/0295454 A1 | 11/2010 | Reed | 315/152 |
| 2010/0295455 A1 | 11/2010 | Reed | 315/152 |
| 2011/0001626 A1 | 1/2011 | Yip et al. | |
| 2011/0006703 A1 | 1/2011 | Wu et al. | |
| 2011/0026264 A1 | 2/2011 | Reed et al. | |
| 2011/0175518 A1 | 7/2011 | Reed et al. | |
| 2011/0221346 A1 | 9/2011 | Lee et al. | |
| 2011/0251751 A1 | 10/2011 | Knight | |
| 2011/0310605 A1 | 12/2011 | Renn et al. | |
| 2012/0001566 A1 | 1/2012 | Josefowicz et al. | |
| 2012/0221154 A1 | 8/2012 | Runge | |
| 2012/0262069 A1 | 10/2012 | Reed | |
| 2013/0043792 A1 | 2/2013 | Reed | |
| 2013/0049613 A1 | 2/2013 | Reed | |
| 2013/0141000 A1 | 6/2013 | Wei et al. | |
| 2013/0141010 A1 | 6/2013 | Reed et al. | |

FOREIGN PATENT DOCUMENTS

| | | | |
|---|---|---|---|
| FR | 2 883 306 | 9/2006 | |
| JP | 6-335241 A | 12/1994 | |
| JP | 2001-333420 | 11/2001 | |
| JP | 2004-279668 A | 10/2004 | |
| JP | 2004/349065 | 12/2004 | |
| JP | 2005-198238 A | 7/2005 | |
| JP | 200593171 * | 7/2005 | H05B 37/02 |
| JP | 2005-310997 A | 11/2005 | |
| JP | 2006-179672 A | 7/2006 | |
| JP | 2006/244711 | 9/2006 | |
| JP | 2008-509538 A | 3/2008 | |
| JP | 2008-130523 A | 6/2008 | |
| JP | 2008-159483 A | 7/2008 | |
| JP | 2008-177144 A | 7/2008 | |
| KR | 10-2005-0078403 A | 8/2005 | |
| KR | 10-2006-0086254 A | 7/2006 | |
| KR | 10-2009-0042400 A | 4/2009 | |
| KR | 10-0935736 B1 | 1/2010 | |
| KR | 20-2010-0007230 U | 7/2010 | |
| KR | 10-1001276 B1 | 12/2010 | |
| KR | 10-1044224 B1 | 6/2011 | |
| KR | 10-1150876 B1 | 5/2012 | |
| WO | 02/076068 | 9/2002 | |
| WO | 03/056882 | 7/2003 | |
| WO | 2006/057866 | 6/2006 | |
| WO | 2007/036873 | 4/2007 | |
| WO | 2008/030450 | 3/2008 | |
| WO | 2009/040703 | 4/2009 | |
| WO | 2012/006710 A1 | 1/2012 | |
| WO | 2012/142115 A2 | 10/2012 | |
| WO | 2014/018773 A1 | 1/2014 | |
| WO | 2014/039683 A1 | 3/2014 | |
| WO | 2014/078854 A1 | 5/2014 | |

OTHER PUBLICATIONS

Reed, "Electronic Control to Regulate Power for Solid-State Lighting and Methods Thereof," U.S. Appl. No. 61/154,619, filed Feb. 23, 2009, 62 pages.

Reed, "Electronic Control to Regulate Power for Solid-State Lighting and Methods Thereof," U.S. Appl. No. 12/619,535, filed Nov. 16, 2009, 62 pages.

International Search Report, mailed Jun. 21, 2010, for PCT/US2009/064625, 3 pages.

Written Opinion, mailed Jun. 21, 2010, for PCT/US2009/064625, 5 pages.

Reed et al., "Low-Profile Pathway Illumination System," U.S. Appl. No. 61/051,619, filed May 8, 2008, 25 pages.

Reed et al., "Gas-Discharge Lamp Replacement," U.S. Appl. No. 61/052,924, filed May 13, 2008, 32 pages.

(56) References Cited

OTHER PUBLICATIONS

Reed et al., "Turbulent Flow Cooling for Electronic Ballast," U.S. Appl. No. 61/088,651, filed Aug. 13, 2008, 23 pages.
Reed et al., "Gas-Discharge Lamp Replacement with Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Electrically Isolated Heat Sink for Solid-State Light," U.S. Appl. No. 61/229,435, filed Jul. 29, 2009, 29 pages.
Reed et al., "Apparatus, Method to Change Light Source Color Temperature with Reduced Optical Filtering Losses," U.S. Appl. No. 61/295,519, filed Jan. 15, 2010, 35 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Renn et al., "Solid State Lighting Device and Method Employing Heat Exchanger Thermally Coupled Circuit Board," U.S. Appl. No. 61/357,421, filed Jun. 22, 2010, 49 pages.
International Search Report, mailed Jul. 9, 2009 for PCT/US2009/043171, 3 pages.
Written Opinion, mailed Jul. 9, 2009 for PCT/US2009/043171, 8 pages.
International Search Report, mailed Dec. 13, 2010 for PCT/US2010/035649, 3 pages.
Written Opinion, mailed Dec. 13, 2010 for PCT/US2010/035649, 4 pages.
"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Oct. 8, 2012 for PCT/US2012/033059, 3 pages.
Written Opinion, mailed Oct. 8, 2012 for PCT/US2012/033059, 3 pages.
Littelfuse, "Application Note: Protecting LEDs in Product Designs," 2009, 2 pages.
Panasonic Electronic Components, "LED Lighting Solutions," 2009, 6 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-based Solid State Lights," U.S. Appl. No. 61/534,722, filed Sep. 14, 2011, 53 pages.
Reed et al., "Electronic Control to Regulate Power for Solid-State Lighting and Methods Thereof," Office Action mailed Feb. 28, 2013, for U.S. Appl. No. 12/619,535, 17 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance mailed Oct. 14, 2011, for U.S. Appl. No. 12/437,472, 9 pages.
Reed et al., "Low-Profile Pathway Illumination System," Office Action mailed May 5, 2011, for U.S. Appl. No. 12/437,472, 24 pages.
Reed et al., "Systems and Methods That Employ Object Recognition," U.S. Appl. No. 13/411,321, filed Mar. 2, 2012, 51 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrostatic Discharge Protection for Luminaire," Office Action mailed Mar. 15, 2013 for U.S. Appl. No. 13/212,074, 11 pages.
Reed "Adjustable Output Solid-State Lighting Device" U.S. Appl. No. 13/707,123, filed Dec. 6, 2012, 49 pages.
Reed, "Apparatus and Method of Energy Efficient Illumination Using Received Signals ," U.S. Appl. No. 13/085,301, filed Apr. 12, 2011, 99 pages.
Reed, "Resonant Network for Reduction of Flicker Perception in Solid State Lighting Systems," U.S. Appl. No. 61/527,029, filed Aug. 24, 2011, 41 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Notice of Allowance mailed Apr. 12, 2013, for U.S. Appl. No. 12/784,093, 9 pages.
Reed, "Luminaire With Atmospheric Electrical Activity Detection and Visual Alert Capabilities," U.S. Appl. No. 13/786,114, filed Mar. 5, 2013, 52 pages.
Written Opinion, mailed Dec. 15, 2010 for PCT/US2010/035658, 3 pages.
Written Opinion, mailed Dec. 28, 2010 for PCT/US2010/035651, 3 pages.
International Search Report, mailed Feb. 27, 2013 for PCT/US2012/065476, 3 pages.
International Search Report, mailed Jan. 14, 2013 for PCT/US2012/052009, 3 pages.
International Search Report, mailed Sep. 30, 2011 for PCT/US2011/021359, 3 pages.
Written Opinion, mailed Feb. 27, 2013, for PCT/US2012/065476, 8 pages.
Written Opinion, mailed Jan. 14, 2013 for PCT/US2012/052009, 5 pages.
Written Opinion, mailed Sep. 30, 2011 for PCT/US2011/021359, 4 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Office Action mailed Dec. 5, 2012, for U.S. Appl. No. 12/784,093, 13 pages.
Reed, "Photocontrol for Luminaire Consumes Very Low Power ," U.S. Appl. No. 13/950,201, filed Jul. 24, 2013, 41 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature Number: SLUP263, Copyright 2010, 2011, Texas Instruments Incorporated, 28 pages.
Kadirvel et al., "Self-Powered, Ambient Light Sensor Using bq25504," Texas Instruments, Application Report, SLUA629—Jan. 2012, 6 pages.
Reed et al., "Adjustable Output Solid-State Lamp With Security Features," U.S. Appl. No. 61/561,616, filed Nov. 18, 2011, 33 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination," Office Action mailed Apr. 24, 2013, for U.S. Appl. No. 12/784,091, 12 pages.

(56) References Cited

OTHER PUBLICATIONS

Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
International Search Report, mailed Nov. 19, 2013 for PCT/US2013/052092, 4 pages.
International Search Report, mailed Dec. 30, 2013 for PCT/US2013/058266, 3 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, for U.S. Appl. No. 13/085,301, 26 pages.
Reed, "High Efficiency Power Controller for Luminaire," U.S. Appl. No. 61/905,699, filed Nov. 18, 2013, 5 pages.
Written Opinion, mailed Nov. 19, 2013 for PCT/US2013/052092, 7 pages.
Written Opinion, mailed Dec. 30, 2013 for PCT/US2013/058266, 8 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Office Action mailed Feb. 27, 2014, for U.S. Appl. No. 13/679,687, 11 pages.
Reed et al., "Apparatus and Method for Schedule Based Operation of a Luminaire," Office Action mailed Mar. 26, 2014, for U.S. Appl. No. 13/604,327, 10 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," Notice of Allowance mailed Apr. 11, 2014, for U.S. Appl. No. 13/943,537, 9 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.
Written Opinion, mailed Feb. 26, 2014, for PCT/US2013/070794, 10 pages.
Reed, "Apparatus and Method of Energy Efficient Illumination Using Received Signals," Office Action mailed Apr. 23, 2014, for U.S. Appl. No. 13/085,301, 12 pages.

\* cited by examiner

LONG-RANGE MOTION DETECTION FOR ILLUMINATION CONTROL

CROSS-REFERENCE TO RELATED APPLICATIONS

The application claims benefit under 35 U.S.C. 119(e) to U.S. provisional patent application Ser. No. 61/180,017, filed May 20, 2009.

BACKGROUND

1. Technical Field

The present disclosure generally relates to the field of illumination devices and, more particularly, to using motion detection to control the illumination level of illumination devices.

2. Description of the Related Art

Energy conservation through the efficient usage of energy has become an important topic in recent years. Efficient usage of energy can result in a multitude of benefits, including financial benefits such as cost savings and environmental benefits such as preservation of natural resources and the environment. In the context of light systems, efficient energy usage by a lighting system is perhaps most effectively accomplished by reducing the illumination level when a high illumination level is not needed. This can be achieved manually by a user of the lighting system or, more conveniently, by some sort of automatic control mechanism that adjust the illumination level according to changes in certain environmental characteristics.

One conventional approach to automatic control of illumination level of lighting systems is to use a passive infrared (PIR) sensor to detect the presence of a human, indicative of the need of lighting. For example, the PIR sensor can be used to provide full power to a lamp when heat emitted by a human body is detected. PIR sensors, however, are not an ideal solution. This is because PIR sensors generally have a very short sensing range with a maximum sensing range of 10 meters typically. Many light poles are 10 meters tall, yet a PIR sensor in a lamp installed on top of a light pole needs to have a detection range much longer than the pole height in order to detect the presence of a person or a heat-emitting object at the periphery of the lighting area. Otherwise, the benefit of using a PIR sensor to automatically control the illumination level under such circumstances would likely be diminished. In addition, PIR sensors require a substantial difference between body temperature and the background ambient temperature for optimal sensitivity. Accordingly, at ambient temperatures approaching the normal temperature of a human body, PIR sensors tend to exhibit reduced sensitivity and thus effectively have a shortened detection range. Furthermore, PIR sensors typically cannot detect objects that are at ambient temperature, such as a door opening for example, although such an event usually indicates the approach of a person and is desirable to detect.

BRIEF SUMMARY

An illumination system may be summarized as including a light source operable to provide at least two levels of illumination; a two-dimensional non-Passive Infrared (non-PIR) imager operable to image an area and to produce image data representative of the images across at least part of a visible portion of an electromagnetic spectrum; and a controller communicatively coupled to receive the image data from the non-PIR imager, the controller configured to process the received image data to detect at least one ambient environmental characteristic of the area in the part of the visible portion of the electromagnetic spectrum where the ambient environmental characteristic is indicative of a presence or imminent presence of a body in the area, and the controller coupled to control operation of the light source based on at least in part detection of the ambient characteristic of the environment. The controller may be configured to adjust the level of illumination provide by the light source based on at least in part the detection of the ambient environmental characteristic that is indicative of a presence or imminent presence of a body in the area. The controller may be configured to cause the light source device to provide illumination at a first illumination level when the image data indicates no motion detected and to provide illumination at a second illumination level when the image data is indicative of motion, the second illumination level greater than the first illumination level. The non-PIR imager may capture a first image of the area at a first time and may capture a second image of the area at a second time, after the first time, each of the first and the second images having a respective plurality of pixels, and wherein the controller compares the image data representative of the first and the second images to detect an appearance or a change between the first and the second images. The controller may adjust an illumination level of the light source from a first illumination level to a second illumination level, that is different from the first illumination level, when the image data representative of the first image and the image data representative of the second image differ by more than a threshold amount. The controller may adjust an illumination level of the light source from a first illumination level to a second illumination level, that is different from the first illumination level, when the image data representative of the first image and the image data representative of the second image differ by more than a threshold amount and when a quantity of the pixels that have changed and that are within a threshold distance from one another is greater than a threshold quantity.

The illumination system may further include a photosensor coupled to provide a signal to the controller indicative of a level of ambient light sensed by the photosensor, wherein the controller is configured to adjust the illumination level of the light source based on the level of ambient light sensed by the photosensor.

The illumination system may further include a clock that provides a clock signal indicative of a time to the controller, wherein the controller causes adjusts the level of illumination from the light source in response to the clock signal. The controller may be further configured to vary a gain setting of the non-PIR imager in response to a signal indicative of a level of ambient brightness. The controller may be configured to deduct the level of illumination provide by the light source from a detected level of ambient brightness and adjust the illumination level provided by the light source in response to the deduction. The controller may adjust the level of illumination from the light source a defined delay period after detecting the ambient environmental characteristic. The at least one ambient environment characteristic may be indicative of a motion in the area. The control device may include at least one of a switch, a potentiometer, an optical sensor, or an input port communicatively coupled to program the controller. The controller may be programmable via an image of a machine-readable symbol imaged by the non-PIR imager. The controller may be configured to adjust the level of illumination level from the light source at a rate at which a level of ambient light is changing.

The illumination system may further include a communication device coupled to the non-PIR imager to receive the image data and operable to transmit the image data using at least one of an Ethernet protocol, an RS-485 protocol, or a wireless communication protocol. The non-PIR imager may include at least one of a solid-state camera, a video camera, or a digital still camera and the light source, non-PIR imager and controller are part of a light fixture that is mountable to an indoor or outdoor structure. An area illuminated by the illumination device may be at least approximately coincident with the area imaged by the non-PIR imager.

A method of controlling a light source may be summarized as including imaging an area with a non-Passive Infrared (non-PIR) imager to produce image data representative of at least part of a visible portion of an electromagnetic spectrum; processing by a processor the image data from the non-PIR imager to detect at least one ambient environmental characteristic of the area that is indicative of a movement in the area; and in response to the detection, adjusting a level of illumination provided to the area from an light source. Imaging an area with an non-PIR imager may include recording data representative of a first image of at least a portion of the area at a first time and recording data representative of a second image of at least the portion of the area at a second time after the first moment in time, wherein processing by a processor the image data to detect at least one ambient environmental characteristic of the area includes comparing the data representative of the first image and the data representative of the second image to detect the movement in the area; and wherein adjusting a level of illumination provided to the area from an light source includes illuminating the area at a first illumination level and then illuminating the area at a second illumination level different from the first illumination level. Comparing the data representative of the first image and the data representative of the second image to detect the movement in the area may include determining whether or not at least a threshold number of pixels in the first and the second images have changed by at least a threshold amount in at least one aspect from the first image to the second image and whether or not each of the pixels that have changed by at least the threshold amount is within a threshold distance from one another. Imaging an area with an non-PIR imager may include receiving data representative of pixels of a first image of the area at a first time and receiving data representative of pixels of a second image of the area at a second time after the first time, wherein processing by a processor the image data to detect at least one ambient environmental characteristic of the area includes comparing the data representative of the pixels of the first image with the data representative of the pixels of the second image to identify pixels that have changed in at least one aspect by more than a threshold amount between the first and the second images, determining a quantity of the pixels that have changed by more than the threshold amount and are within a threshold distance from other pixels that have changed by more than the threshold amount, and generating a first signal indicative of the detection of movement if the quantity of the changed pixels is greater than a threshold quantity.

The method may further include determining whether a present time is during a period of daylight hours; and terminating illumination of the area by the light source when the present time is determined to be during the period of daylight hours.

The method may further include determining a level of ambient light in the area; illuminating the area at a first level of illumination in response to both the determined level of ambient light in the area being below an ambient light threshold and no movement being detected; illuminating the area at a second level of illumination in response to both the determined ambient light level in the area being below the ambient light threshold and movement being detected; and terminating illumination of the area by the light source in response to the determined ambient light level being at least equal to the ambient light threshold. Determining a level of ambient light in the area may include sensing a total level of light in the area; and deducting a current level of illumination being provided by the light source from the sensed total level of light in the area.

Figure 1:
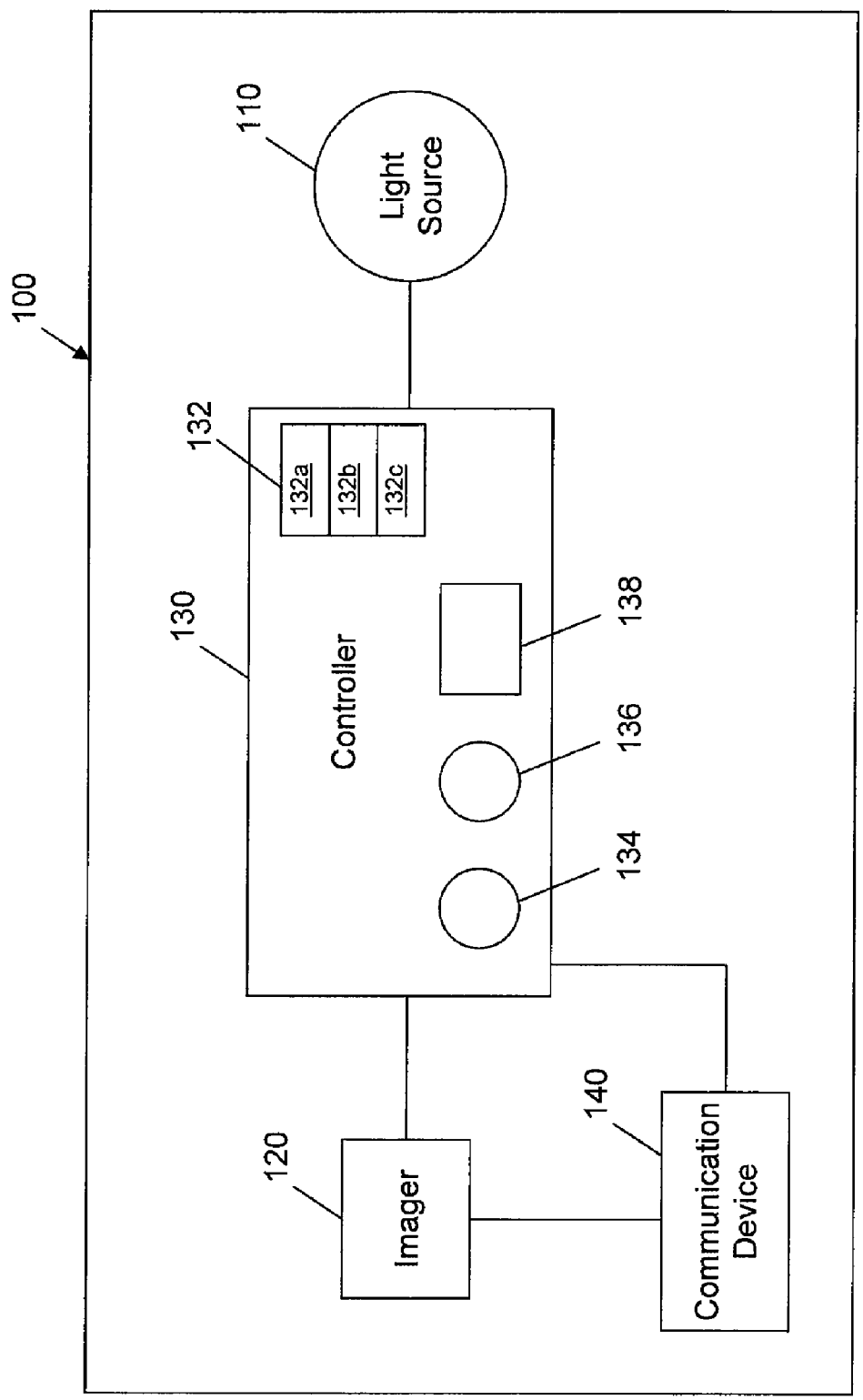
FIG. 1 is a diagram showing an illumination system according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with luminaires and imaging devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

FIG. 1 illustrates an illumination system 100 according to one non-limiting illustrated embodiment. The illumination system 100 includes a light source 110, a non-Passive Infrared (non-PIR) imager 120 and a controller 130. The light source 110 illuminates when electric power is provided to the light source 110 and the illumination level of the light source 110 may be adjusted by adjusting the electric power provided. The light source 110 is capable of providing at least two levels of illumination, e.g., a low level of illumination and a high level of illumination, when powered to illuminate. The light source 110 may include any type of light emitter, including incandescent lamp, fluorescent lamp, arc lamp, gas-discharge lamp and solid-state light emitter, such as light-emitting diode. When powered, the light source 110 provides illumination to an area at, below, above or adjacent where the illumination system 100 is located depending on whether and how light emitted by the light source 110 is directed.

The non-PIR imager 120 is a two-dimensional imager that images an area to produce data representative of two-dimensional images across at least part of a visible portion of an electromagnetic spectrum. That is, the non-PIR imager 120 captures images in the visible range of the electromagnetic spectrum, which is different from the infrared range of the electromagnetic spectrum. In one embodiment, the non-PIR imager 120 is a digital image sensor that converts an optical image to electrical signals that may be stored as digital data representative of a plurality of pixels of the image. In one embodiment, the non-PIR imager 120 is a camera such as, for example, a solid-state camera, digital still camera, or video camera, analog video camera coupled to a frame grabber. The gain setting of the non-PIR imager 120 is adjustable. For example, when the ambient light level is low the non-PIR imager 120 has a high gain setting and when the ambient light level is high the non-PIR imager 120 has a low gain setting. Accordingly, the ambient light level may be determined based on the gain setting of the non-PIR imager 120. The non-PIR imager 120 includes a lens in one embodiment.

The controller 130 is communicatively coupled to receive image data from the non-PIR imager 120 to control operations of the light source 110 based on the image data. In particular, the controller 130 processes the received image data to detect at least one ambient environmental characteristic of the area in the part of the visible portion of the electromagnetic spectrum where the ambient environmental characteristic indicates the presence or imminent presence of a body in the area, such as movement or motion by a human or an object, for example. The controller 130 controls operations of the light source 110, including activation, deactivation and adjustment of the illumination level of the light source 110, based on, at least in part, the detection of the ambient environmental characteristic that is indicative of a presence or imminent presence of a body in the area. In one embodiment, the controller 130 is configured to cause the light source device to provide illumination at a first illumination level when the image data indicates no motion detected and to provide illumination at a second illumination level when the image data is indicative of motion, the second illumination level greater than the first illumination level.

In one embodiment, the non-PIR imager 120 captures a first image of the area at a first time and captures a second image of the area at a second time, after the first time, where each of the first and the second images has a respective plurality of pixels. The controller 130 then compares the image data representative of the first and the second images to detect an appearance or a change between the first and the second images, thereby detecting movement in the area in order to adjust illumination level of the light source 110 accordingly. In one embodiment, the controller 130 adjusts an illumination level of the light source 110 from a first illumination level to a second illumination level, different from the first illumination level (e.g., higher than the first illumination level), when the image data representative of the first image and the image data representative of the second image differ by more than a threshold amount. In an alternative embodiment, the controller 130 adjusts an illumination level of the light source 110 from the first illumination level to the second illumination level when the image data representative of the first image and the image data representative of the second image differ by more than a threshold amount and when a quantity of the pixels that have changed and that are within a threshold distance from one another is greater than a threshold quantity. Thus, in order for the controller 130 to determine there is motion in the area, a sufficient number of pixels need to have changed by more than a threshold amount in at least one aspect, from the first image to the second image, and that these pixels need to be within a threshold distance from one another. This ensures that motion detection is based on motion of an object, such as a person or an object caused to move by a person, and not based on noise in the electrical signals representative of the pixels, for example.

In one embodiment, the controller 130 is capable of detecting motion that occurs at a distance of at least 25 meters away from the non-PIR imager 120 using images captured by the non-PIR imager 120. This allows the illumination system 100 to be installed on a typical 10-meter-tall light pole and still be able to detect motion that occurs more than 20 meters from the base of the light pole.

The controller 130 has a memory 132 that may be used to store data, including the captured images from the non-PIR imager 120. The memory 132 includes a plurality of memory areas, such as the memory areas 132a, 132b and 132c shown in FIG. 1, although the memory 132 may have a different number of memory areas in other embodiments. In one embodiment, the controller 130 stores in the memory area 132a a first image captured by the non-PIR imager 120 at a first moment in time, stores in the memory area 132b a second image captured by the non-PIR imager 120 at a second moment in time that is after the first moment in time, and compares the first and the second images to determine whether or not there is motion in the area the images of which is captured by the non-PIR imager 120.

In one embodiment, the motion detection algorithm utilized by the controller 130 determines there is motion in the area when the data representative of the pixels of the first image and the data representative of the pixels of the second image differ by more than a threshold amount in at least one aspect, such as chrominance or luminance, for example. When the data representative of the pixels of the first image and the data representative of the pixels of the second image differ by less than a threshold amount, indicating no motion in the area, the controller 130 causes the light source 110 to illuminate at a first illumination level. When the data representative of the pixels of the first image and the data representative of the pixels of the second image differ by more than a threshold amount, indicating motion in the area, the controller 130 causes the light source 110 to illuminate at a second illumination level that is higher than the first illumination level. For example, the illumination level of the light source 110 may be set to a low level, just sufficient for the non-PIR imager 120 to capture discernible images, when there is no motion in the area; and when the controller 130 detects motion based on the captured images the illumination level of the light source 110 may be set to a high level that is appropriate for the area that is illuminated. In one embodiment, the first illumination level is approximately 10% of the full illumination rating of the light source 110, and the second illumination level is approximately the full illumination rating of the light source 110. Alternatively, the first illumination level is a low illumination level that is determined based on the sensitivity of the particular imaging device 110 at use, and the second illumination level is an illumination level higher than the first illumination level.

In an alternative embodiment, the motion detection algorithm determines there is motion in the area based on an additional criterion. That is, motion is detected not only because the data representative of the pixels of the first image and the data representative of the pixels of the second image differ by more than a threshold amount, but also because the quantity of the pixels that have changed from the first image to the second image and that are within a threshold distance from other pixels that have changed is greater than a threshold quantity. For example, the locations of the pixels that have changed by more than the threshold amount are stored in memory area 132c. The locations of such pixels are compared to one another and the quantity of such pixels is counted to determine whether there is motion in the area. Thus, in order for the controller 130 to determine there is motion in the area, a sufficient number of pixels need to have changed by more than a threshold amount in at least one aspect, from the first image to the second image, and that these pixels need to be within a threshold distance from one another. This ensures that motion detection is based on motion of an object, such as a person or an object caused to move by a person, and not based on noise in the electrical signals representative of the pixels, for example.

The controller 130 is capable of determining a present time of the day or an ambient light level to adjust the illumination level of the light source 110 accordingly. In one embodiment, the controller 130 includes a photosensor 134 that converts sensed electromagnetic energy, such as daylight or ambient light, into a corresponding electrical signal. The controller 130 can adjust the sensor gain or sensitivity of the photosensor 134 in one embodiment. In another embodiment, the controller 130 includes a real-time clock 136. In yet another embodiment, the controller 130 includes both the photosensor 134 and the real-time clock 136. The controller 130 therefore determines whether or not illumination by the light source 110 is necessary, based on at least one of the ambient light level sensed by the photosensor 134, the present time as indicated by the real-time clock 136 and the gain setting of the non-PIR imager 120, or any combination thereof. In one embodiment, the light source 110 is deactivated, or turned OFF, when the controller 130 determines that the present time is during daylight hours or that the ambient light level is above an ambient light threshold.

As the controller 130 is capable of determining the present time of the day, the controller 130 may adjust the illumination level of the light source 110 based on the determined present time, motion detection, or both. In one embodiment, depending on what the present time of the day is as determined by the controller 130 or what the ambient light level is, the illumination level of the light source 110 is adjusted accordingly by the controller 130. For example, the light source 110 may be turned OFF when the present time is determined to be 11:00 am, at which time illumination of the area by the light source 110 is usually not necessary. Further, the illumination level of the light source 110 may be set to a relatively low level when the present time is determined to be, for example, 4:30 pm, when it might begin to get dark especially during winter times, and set to a relatively high level when the present time is determined to be, for example, 10:00 pm. In another example, the controller 130 causes the light source 110 to illuminate at the first illumination level when the ambient light level is less than the ambient light threshold. The controller 130 may store the state of the light source 110, such as the illumination level, in the memory 132 and deducts this artificial illumination level from the sensed ambient light level. This enables the controller 130 to detect when daylight occurs even if the light source 110 is illuminating at its full illumination rating. When daylight is determined to be above the ambient light threshold, the controller 130 may deactivate, or turn OFF, the light source 110 to conserve energy.

In one embodiment, appropriate time delays are added before the light source 110 is activated or deactivated. During these delays the state of daylight or night must remain constant or the controller 130 starts the time delay again. This suppresses short-term noise events and thereby avoids the controller 130 from being falsely triggered to activate the light source 110 due to short-term events such as vehicle headlights or a transient moving object.

In one embodiment, the controller 130 is programmable and includes an input port 138 through which a user can program the controller 130. For example, the time delays and the various illumination levels of the light source 110 as adjusted by the controller 130 may be programmed. The input port 138 may include switches and/or potentiometers that can be set to program the controller 130. Alternatively, the input port 138 may include an electrical interface for the user to remotely program the controller 130 whether through a wire or wirelessly. In one embodiment, the controller 130 is programmable optically via one or more images captured by the non-PIR imager 120. In one embodiment, printed barcode pages are used to set delay times and other parameters used by the controller 130. A printed barcode page is held in the field of view of the non-PIR imager 120, which captures the image of the barcode, and the controller 130 uses standard barcode decoding software to determine and store the value represented by the barcode. Any barcode symbol may be used in this method, including two-dimensional barcodes as commonly used in the package shipping industry. The controller 130 may also receive a one-bit input via the input port 138 to activate or deactivate the light source 110. For example, a binary bit of "0" turns OFF the light source 110 and a binary bit of "1" turns ON the light source 110.

In one embodiment, the controller 130 is programmed to turn ON the light source 110 after dark to illuminate at a high level for a programmed length of time, two hours for example, and to decrease the illumination level to a lower level after the programmed length of time. For example, in a corporation parking lot setting, illumination of the parking lot is provided during a period of time after dark when employees are expected to leave for home and the illumination is provided independent of or without motion detection. In another embodiment, the controller 130 is programmed to cause the light source 110 to illuminate at the same or a different high level for a programmed length of time before daylight. For example, illumination of the parking lot is again provided during a period of time before daylight when employees are expected to come to work and the illumination is provided independent of or without motion detection.

In one embodiment, the controller 130 samples the ambient light level through the photosensor 134 at specified intervals to adjust the illumination level of the light source 110 at a predetermined rate that is similar to the rate at which natural illumination increases as daylight approaches and decreases as daylight fades away. This prevents the light source 110 from being turned OFF by accident or intentional illumination by light sources such as headlamps or flashlights. Such feature renders the illumination system 100 resistant to criminals attempting to deactivate the light source 110 by the use of artificial light sources. An additional security feature is the use of the solar time of day to ensure that the controller 130 will cause the light source 110 to stay ON during night time. The solar time of day may be provided by the real-time clock 136. Alternatively, the solar time of day is computed by detecting dusk and dawn on successive days and setting the 24:00 hour to be at the middle of the dusk to dawn period. By adjusting the logical dusk and dawn times with a time constant of many days, short periods of illumination at night are not falsely detected as dawn events. In addition, the controller 130 can be programmed to turn ON the light source 110 at an appropriate illumination level. For example, the turn-on illumination level may be set to 1 foot candle for non-critical locations and set to 35 foot candles for airports or other critical areas.

In one embodiment, the non-PIR imager 120 and the controller 130 are each powered by the same power source that powers the light source 110, such as commercial or residential AC power mains. In another embodiment, one or both of the non-PIR imager 120 and the controller 130 are each powered by a DC power source, such as a battery. The controller 130 may contain a power regulator to convert line-in AC power to a low-voltage DC power to power the controller 130 and the non-PIR imager 120. Alternatively, the power regulator may be a part of the illumination system 100 that is separate from the controller 130. The interface to the non-PIR imager 120 may be a galvanically isolated type, so that connection to the power mains is isolated for safety reasons.

In one embodiment, the controller 130 and the non-PIR imager 120 are integral parts of a semiconductor-based integrated circuit or chip. In one embodiment, the controller 130 is implemented in the form of a semiconductor-based integrated circuit. In other embodiments, some parts of the controller 130 are implemented in the form of semiconductor-based integrated circuit while other parts of the controller 130 are implemented on printed circuit board.

In one embodiment, the area the images of which are captured by the non-PIR imager 120 is approximately the same as the area illuminated by the light source 110. In another embodiment, the area the images of which are captured by the non-PIR imager 120 overlaps at least partially the area illuminated by the light source 110. In yet another embodiment, the area the images of which are captured by the non-PIR imager 120 does not overlap the area illuminated by the light source 110.

In one embodiment, the illumination system 100 further includes a communication device 140. The communication device 140 may be coupled to the non-PIR imager 120 or the controller 130, or both. The communication device 140 is further coupled to an external data network using protocols in compliance with any or all of the Ethernet, the RS-485 and wireless communication standards, such as the IEEE 802.11 standards for example. The communication device 40 is used to remotely program the controller 130 in one embodiment. Alternatively, the communication device 140 is used to transmit the captured images from the non-PIR imager 120 to a remote user for viewing. In another embodiment, the communication device 140 is used to transmit a notification signal from the controller 130 indicative of motion detection to a remote user. In yet another embodiment, the communication device 140 is used to transmit an actuation signal from the controller 130 to actuate a device such as an alarm or an automatic door, for example, upon detection of motion.

Figure 2A:
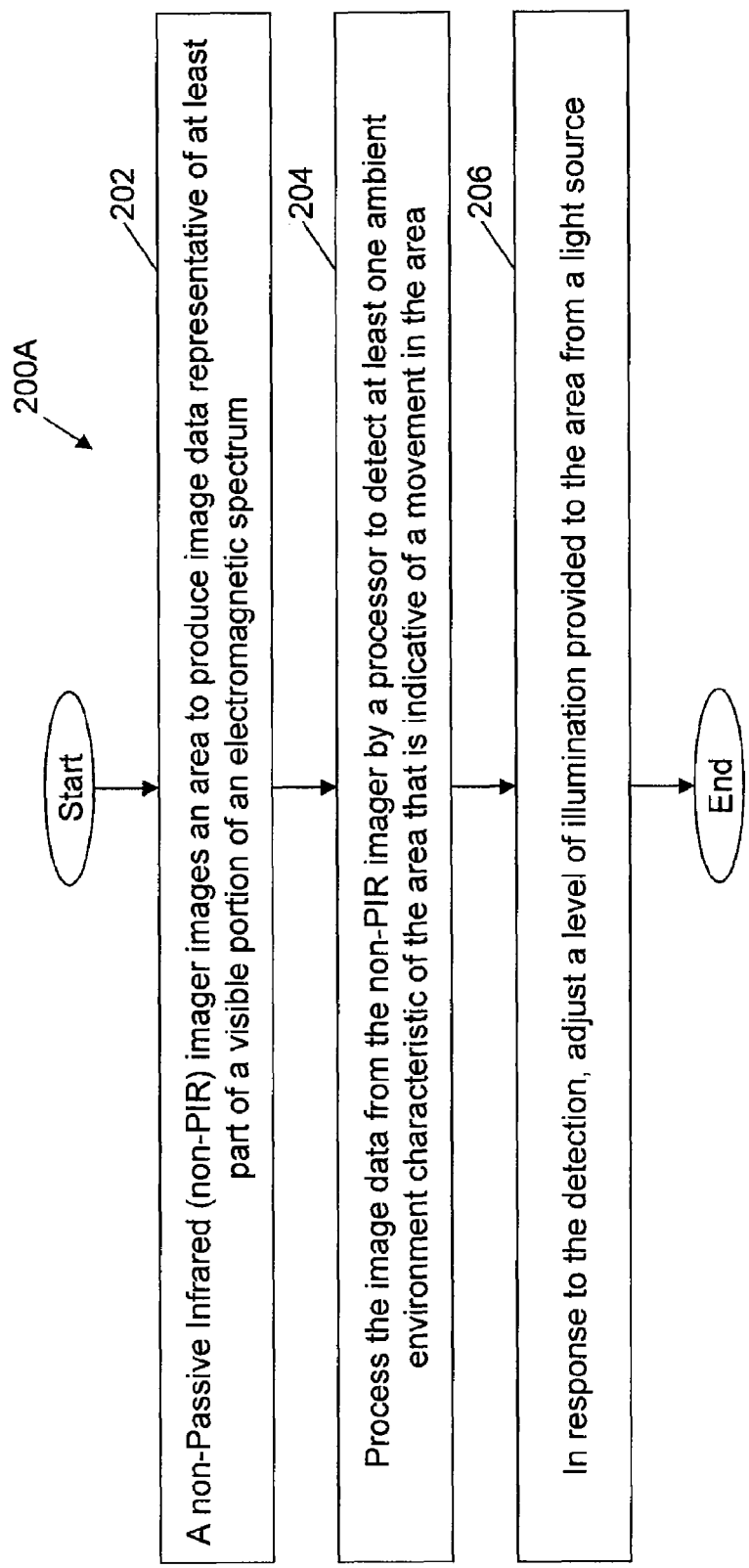
FIG. 2A is a flow chart showing a process of controlling a light source according to one non-limiting illustrated embodiment.

FIG. 2A illustrates a process 200A of controlling a light source according to one non-limiting illustrated embodiment. At 202, a non-Passive Infrared (non-PIR) imager images an area to produce image data representative of at least part of a visible portion of an electromagnetic spectrum. At 204, the image data from the non-PIR imager is processed by a processor to detect at least one ambient environment characteristic of the area that is indicative of a movement in the area. At 206, a level of illumination provided to the area from a light source is adjusted in response to the detection.

In one embodiment, the level of illumination from the light source is adjusted from a first illumination level to a second illumination level that is higher than the first illumination level. For example, at dark a light source is turned ON to at least the first illumination level that is sufficient to illuminate the illumination area to allow a non-PIR imager, such as a video camera or a digital still camera, to detect motion in its field of view. The field of view of the non-PIR imager at least partially overlaps the illuminated area. In one embodiment, the first illumination level is approximately 10% of the full illumination rating of the illumination device. Alternatively, the first illumination level is a low illumination level that is determined based on the sensitivity of the particular non-PIR imager at use. When motion is detected based on the image data from the non-PIR imager, the illumination level is increased to the second illumination level that is appropriate for the area to be illuminated. In one embodiment, the second illumination level is approximately the full illumination rating of the illumination device.

In one embodiment, data representative of a first image of at least a portion of the area at a first time is recorded, and data representative of a second image of at least a portion of the area at a second time that is after the first time is also recorded, when the non-PIR imager images the area. In one embodiment, when processing the image data from the non-PIR imager, the processor compares the data representative of the first image and data representative of the second image to detect the movement in the area.

In one embodiment, comparing the data representative of the first and the second images includes determining whether or not at least a threshold number of pixels in the first and the second images have changed by at least a threshold amount in at least one aspect from the first image to the second image. The comparing of the data representative of the first and the second images also includes determining whether or not each of the pixels that have changed by at least the threshold amount is within a threshold distance from one another.

In one embodiment, data representative of pixels of a first image of the area at a first time and data representative of pixels of a second image of the area at a second time that is after the first time are received when the non-PIR imager images the area. In one embodiment, the processor compares the data representative of the pixels of the first image with the data representative of the pixels of the second image to identify pixels that have changed in at least one aspect by more than a threshold amount between the first and the second images. The processor also determines a quantity of the pixels that have hanged by more than the threshold amount and that are within a threshold distance from other pixels that have changed by more than the threshold amount. The processor further generates a first signal to indicate detection of movement if the quantity of the changed pixels is greater than a threshold quantity.

Figure 2B:
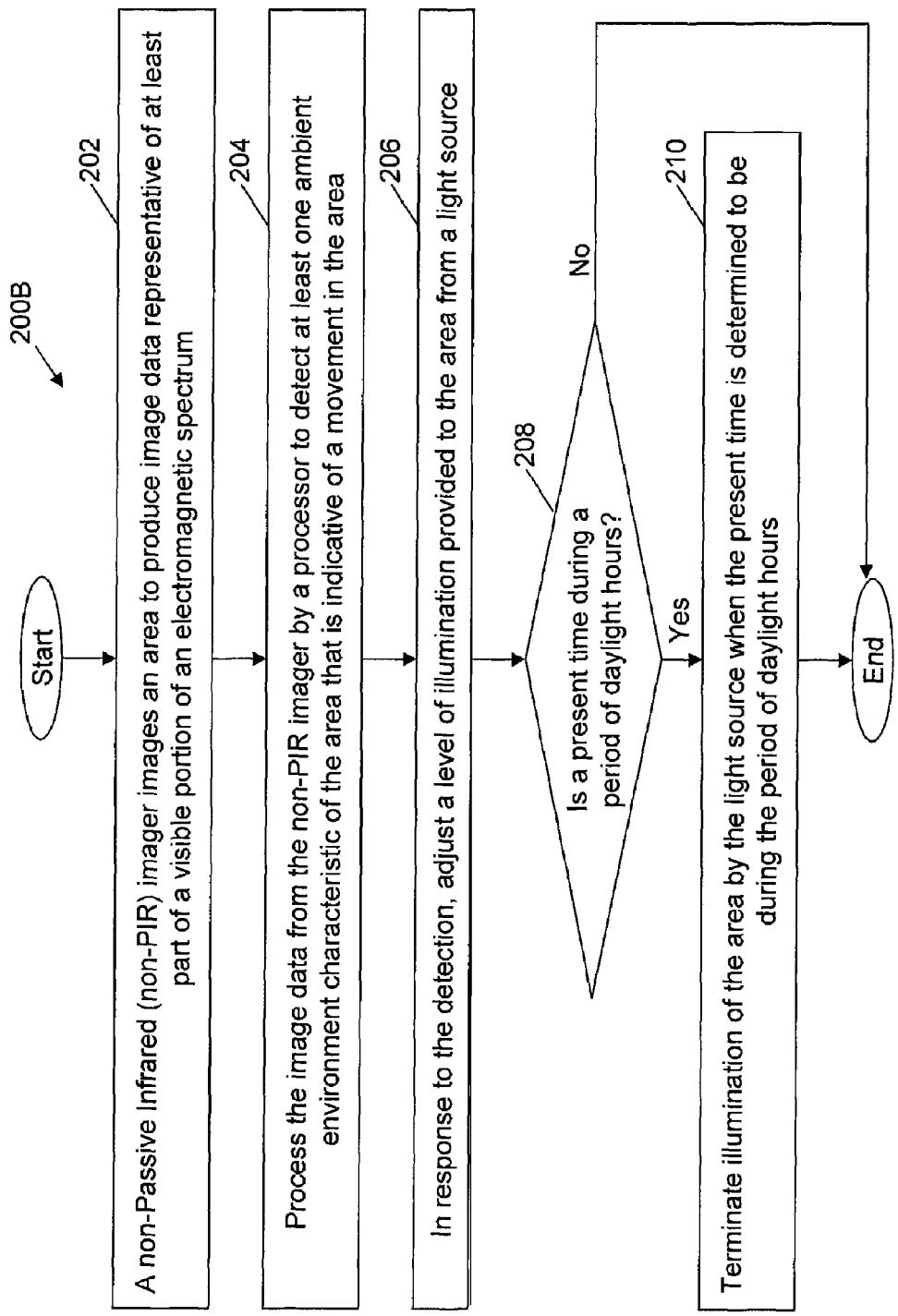
FIG. 2B is a flow chart showing a process of controlling a light source according to another non-limiting illustrated embodiment.

FIG. 2B illustrates a process 200B of controlling a light source according to another non-limiting illustrated embodiment. The process 200B performs the tasks performed by the process 200A. Additionally, at 208, it is determined whether a present time is during a period of daylight hours. At 210, illumination of the area by the light source is terminated when the present time is determined to be during the period of daylight hours. Otherwise, the process 200B ends if the present time is determined to be not during the period of daylight hours.

Energy conservation can be achieved by turning OFF the light source during daylight hours when illumination of the area by artificial illumination is unnecessary. For example, the area of concern is illuminated at the first illumination level at dark after daylight hours in order for the light source to be able to detect motion. When motion is detected, indicating the possibility of presence of people, the area is illuminated at the second illumination level, which is brighter than the first illumination level, so that the illuminated area is bright enough for human activities. During the daylight hours, however, illumination of the area by a light source is unnecessary and therefore illumination by the illumination device is terminated.

In one embodiment, whether or not the present time is during daylight hours is determined based on an ambient light level detected by a photosensor. In an alternative embodiment, whether or not the present time is during daylight hours is determined based on a present time indicated by a real-time clock. In another embodiment, whether or not the present time is during daylight hours is determined based on a gain setting of a non-PIR imager. In another embodiment, whether or not the present time is during daylight hours is determined based on the signal level from the non-PIR imager, such as an NTSC video signal level or the digital values in a digital camera signal. Alternatively, whether or not the present time is during daylight hours is determined based on a combination of any, some or all of an ambient light level detected by a photosensor, a present time indicated by a real-time clock, a gain setting of a non-PIR imager, and the signal level from the non-PIR imager.

Figure 2C:
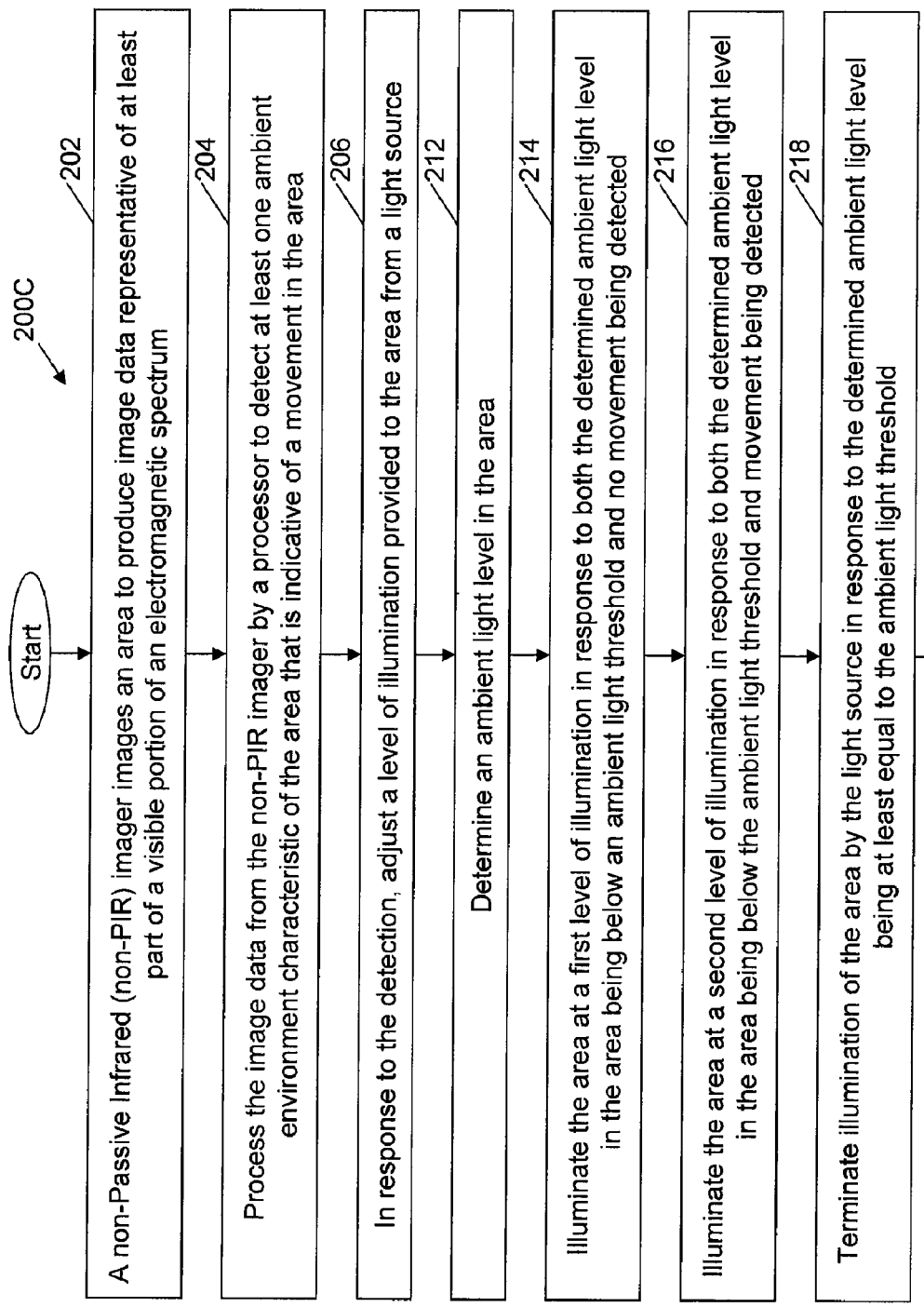
FIG. 2C is a flow chart showing a process of controlling a light source according to yet another non-limiting illustrated embodiment.

FIG. 2C illustrates a process 200C of controlling a light source according to yet another non-limiting illustrated embodiment. The process 200C performs the tasks performed by the process 200A. Additionally, at 212, an ambient light level in the area is determined. At 214, the area is illuminated at a first level of illumination in response to both the determined ambient light level in the area being below an ambient light threshold and that no movement is detected. At 216, the area is illuminated at a second level of illumination in response to both the determined ambient light level in the area being the ambient light threshold and that movement is detected. At 218, illumination of the area by the light source is terminated in response to the determined ambient light level being at least equal to the ambient light threshold. In one embodiment, the total level of light in the area is sensed and a current level of illumination being provided by the light source is deducted from the sensed total level of light in the area to determine the ambient light level in the area.

Motion detection based on comparison of images may be used as a triggering event in a variety of applications. In some embodiments, motion detection based on comparison of images of an area may be used to adjust the illumination of the area or an adjacent area, such as a parking lot, garage, hall way, open field, sidewalk, entrance of a building, etc.

In one embodiment, a notification signal is transmitted upon detection of movement in the area. In one embodiment, transmission of the notification signal is via a communication link based on Ethernet. In an alternative embodiment, transmission of the notification signal is via a communication link based on RS-485. In another embodiment, transmission of the notification signal is via a communication link based on wireless communication standards such as, for example, the IEEE 802.11 standards or other wireless communication standards used in mobile phone applications. In yet another embodiment, transmission of the notification signal is via a communication link based on any combination of the Ethernet, RS-485, and wireless communication standards.

In one embodiment, the transmitted notification signal is used to actuate a device in response to the motion detection. For example, the notification signal may be used to actuate a security alarm to provide notification of a potential intrusion by uninvited personnel. As another example, the notification signal may be used to open an automatic door to allow a visitor to enter a fenced premise. The actuation of a device may concurrently occur with the adjustment of the illumination level provided by an illumination device.

Thus, a luminaire with controllable illumination level, such as the illumination system 100, is disclosed herein and should greatly improve upon the problems associated with the conventional approach to automatic control of illumination level of lighting systems described above. For instance, the illumination system 100 can detect motion at a distance of at least 25 meters away. Other than adjusting the illumination level based on motion detection, the illumination level can also be adjusted based on the ambient light level and/or the present time of day. The illumination system 100 can be programmed remotely, for example, optically or wirelessly. Besides controlling the level of illumination of an area, the illumination system 100 can also serve as a security device.

U.S. provisional patent application Ser. No. 61/180,017, filed May 20, 2009 is incorporated herein by reference, in its entirety.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of controlling operations of an illumination system generally described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An illumination system, comprising:
   a two-dimensional non-Passive Infrared (non-PIR) imager that images an area and produces image data representative of images across at least part of a visible portion of an electromagnetic spectrum;
   a light source that provides at least two levels of illumination in addition to a zero level of illumination in the area, wherein a first level of illumination corresponds to a non-zero level of illumination and a second level of illumination corresponds to a higher level of illumination than the first level of illumination; and
   a controller communicatively coupled to receive the image data from the non-PIR imager that determines at least a first period which is indicative of a daylight period and a second period which is indicative of a non-daylight period, and which processes the received image data to:
   detect at least one ambient environmental characteristic of the area in the part of the visible portion of the electromagnetic spectrum wherein the ambient environmental characteristic is indicative of a presence or imminent presence of a body in the area;

vary a gain setting of the non-PIR imager in response to a signal indicative of a level of ambient brightness; and control operation of the light source by;

deactivating the light source during the first period;

activating the light source at the second illumination level in the area for at least a portion of the second period responsive to the detection of an environmental characteristic of the area indicative of a presence or imminent presence of a body in the area; and activating the light source at the first illumination level in the area for at least a portion of the second period.

2. The illumination system of claim 1 wherein the controller causes the light source device to provide illumination at a first illumination level when the image data indicates no motion detected and to provide illumination at a second illumination level when the image data is indicative of motion, the second illumination level greater than the first illumination level.

3. The illumination system of claim 1 wherein the non-PIR imager captures a first image of the area at a first time and captures a second image of the area at a second time, after the first time, each of the first and the second images having a respective plurality of pixels, and wherein the controller compares the image data representative of the first and the second images to detect an appearance or a change between the first and the second images.

4. The illumination system of claim 3 wherein the controller adjusts an illumination level of the light source from a first illumination level to a second illumination level, that is different from the first illumination level, when the image data representative of the first image and the image data representative of the second image differ by more than a threshold amount.

5. The illumination system of claim 3 wherein the controller adjusts an illumination level of the light source from a first illumination level to a second illumination level, that is different from the first illumination level, when the image data representative of the first image and the image data representative of the second image differ by more than a threshold amount and when a quantity of the pixels that have changed and that are within a threshold distance from one another is greater than a threshold quantity.

6. The illumination system of claim 1, further comprising: a photosensor coupled to provide a signal to the controller indicative of the level of ambient brightness sensed by the photosensor, wherein the controller adjusts the illumination level of the light source based on the level of ambient brightness sensed by the photosensor.

7. The illumination system of claim 1, further comprising: a real time clock that provides a clock signal indicative of a time to the controller, wherein the controller adjusts the level of illumination from the light source in response to the clock signal, wherein the controller determines the first period and the second period based at least in part on the clock signal received from the real time clock.

8. The illumination system of claim 1 wherein the controller deducts the level of illumination provide by the light source from a detected level of ambient brightness and adjusts the illumination level provided by the light source in response to the deduction.

9. The illumination system of claim 1 wherein the controller adjusts the level of illumination from the light source a defined delay period after detecting the ambient environmental characteristic.

10. The illumination system of claim 1 wherein the at least one ambient environment characteristic is indicative of a motion in the area.

11. The illumination system of claim 1 wherein the control device includes at least one of a switch, a potentiometer, an optical sensor, or an input port communicatively coupled to program the controller.

12. The illumination system of claim 1 wherein the controller is programmable via an image of a machine-readable symbol imaged by the non-PIR imager.

13. The illumination system of claim 1 wherein the controller adjusts the level of illumination level from the light source at a rate at which a level of ambient light is changing.

14. The illumination system of claim 1, further comprising: a communication device coupled to the non-PIR imager to receive the image data and operable to transmit the image data using at least one of an Ethernet protocol, an RS-485 protocol, or a wireless communication protocol.

15. The illumination system of claim 1 wherein the non-PIR imager comprises at least one of a solid-state camera, a video camera, or a digital still camera and the light source, non-PIR imager and controller are part of a light fixture that is mountable to an outdoor structure.

16. The illumination system of claim 1 wherein an area illuminated by the illumination device is at least approximately coincident with the area imaged by the non-PIR imager.

17. A method of controlling a light source, the method comprising:

imaging an area with a non-Passive Infrared (non-PIR) imager to produce image data representative of at least part of a visible portion of an electromagnetic spectrum;

varying a gain setting of the non-PIR imager in response to a signal indicative of a level of ambient brightness;

determining at least a first period which is indicative of a daylight period and a second period which is indicative of a non-daylight period;

processing by a processor the image data from the non-PIR imager to detect at least one ambient environmental characteristic of the area that is indicative of a movement in the area;

adjusting, by the controller, a communicably coupled light source to produce a zero level of illumination in the area during the first period;

adjusting, by the controller, the communicably coupled light source to produce a first, non-zero, level of illumination in the area during at least a portion of the second period; and in response to the detection of an environmental characteristic of the area indicative of a presence or imminent presence of a body in the area, adjusting, by the controller, the communicably coupled light source to produce a second, non-zero, level of illumination in the area, wherein the second level of illumination corresponds to a higher level of illumination than the first level of illumination.

18. The method of claim 17 wherein imaging an area with an non-PIR imager includes recording data representative of a first image of at least a portion of the area at a first time and recording data representative of a second image of at least the portion of the area at a second time after the first time, wherein processing by a processor the image data to detect at least one ambient environmental characteristic of the area includes comparing the data representative of the first image and the data representative of the second image to detect the movement in the area, and wherein adjusting a level of illumination provided to the area from an light source includes illuminating the area at a first illumination level and then illuminating the area at a second illumination level different from the first illumination level.

19. The method of claim 18 wherein comparing the data representative of the first image and the data representative of the second image to detect the movement in the area comprises determining whether or not at least a threshold number of pixels in the first and the second images have changed by at least a threshold amount in at least one aspect from the first image to the second image and whether or not each of the pixels that have changed by at least the threshold amount is within a threshold distance from one another.

20. The method of claim 17 wherein imaging an area with an non-PIR imager includes receiving data representative of pixels of a first image of the area at a first time and receiving data representative of pixels of a second image of the area at a second time after the first time, wherein processing by a processor the image data to detect at least one ambient environmental characteristic of the area includes comparing the data representative of the pixels of the first image with the data representative of the pixels of the second image to identify pixels that have changed in at least one aspect by more than a threshold amount between the first and the second images, determining a quantity of the pixels that have changed by more than the threshold amount and are within a threshold distance from other pixels that have changed by more than the threshold amount, and generating a first signal indicative of the detection of movement if the quantity of the changed pixels is greater than a threshold quantity.

21. The method of claim 17, further comprising:
determining whether a present time as determined by a real time clock is during a period of daylight hours; and
terminating illumination of the area by the light source when the present time is determined to be during the period of daylight hours.

22. The method of claim 17 wherein determining a level of ambient brightness in the area includes:
sensing a light intensity in the area; and
deducting a current level of illumination being provided by the light source from the sensed light intensity in the area.

23. The illumination system of claim 1 wherein the controller determines at least a first period which is indicative of a daylight period and a second period which is indicative of a non-daylight period based at least in part on a signal level of a signal received from the non-PIR imager.

24. The illumination system of claim 1 wherein the controller determines at least a first period which is indicative of a daylight period and a second period which is indicative of a non-daylight period using the gain setting of the non-PIR imager.

25. The method of claim 17 wherein determining at least a first period which is indicative of a daylight period and a second period which is indicative of a non-daylight period includes determining at least a first period which is indicative of a daylight period and a second period which is indicative of a non-daylight period based at least in part on a signal level of a signal received from the non-PIR imager.

\* \* \* \* \*